US009633324B2

(12) United States Patent
Ross et al.

(10) Patent No.: US 9,633,324 B2
(45) Date of Patent: *Apr. 25, 2017

(54) DETERMINING A QUALITY SCORE FOR INTERNAL QUALITY ANALYSIS

(71) Applicant: BANK OF AMERICA CORPORATION, Charlotte, NC (US)

(72) Inventors: Jeannette M. Ross, Lake Wylie, SC (US); Shilpi Choudhari, Hyderabad (IN); Priyanka Kapoor, New Delhi (IN); Tomy Victor Pathrose, Tamil Nadu (IN); Antonio J. Kinney, Charlotte, NC (US)

(73) Assignee: BANK OF AMERICA CORPORATION, Charlotte, NC (US)

(*) Notice: Subject to any disclaimer, the term of this patent is extended or adjusted under 35 U.S.C. 154(b) by 0 days.

This patent is subject to a terminal disclaimer.

(21) Appl. No.: 15/011,071

(22) Filed: Jan. 29, 2016

(65) Prior Publication Data

US 2016/0162826 A1 Jun. 9, 2016

Related U.S. Application Data

(63) Continuation of application No. 13/944,164, filed on Jul. 17, 2013, now Pat. No. 9,286,394.

(51) Int. Cl.
*G06F 17/30* (2006.01)
*G06Q 10/06* (2012.01)
*H04L 29/06* (2006.01)

(52) U.S. Cl.
CPC . *G06Q 10/06395* (2013.01); *G06F 17/30864* (2013.01); *H04L 63/08* (2013.01); *H04L 63/10* (2013.01)

(58) Field of Classification Search
CPC .................. G06F 17/30554; G06F 17/30864
USPC ............ 707/722, 748, 758; 706/52; 705/36; 717/101, 102, 103
See application file for complete search history.

(56) References Cited

U.S. PATENT DOCUMENTS

| | | |
|---|---|---|
| 5,220,657 A | 6/1993 | Bly et al. |
| 5,655,074 A | 8/1997 | Rauscher et al. |
| 5,903,453 A | 5/1999 | Stoddard, II |
| 6,219,805 B1 | 4/2001 | Jones et al. |
| 6,256,773 B1 | 7/2001 | Bowman-Amuah |
| 6,477,471 B1 | 11/2002 | Hedstrom et al. |

(Continued)

OTHER PUBLICATIONS

Ballou et al., Enhancing data quality in data warehouse environments, Jan. 1999, ACM, vol. 42, 73-78.*

(Continued)

*Primary Examiner* — Jean B Fleurantin
(74) *Attorney, Agent, or Firm* — Michael A. Springs; Moore & Van Allen PLLC; W. Kevin Ransom (57) ABSTRACT

An apparatus for assessing and controlling the quality of a project in a production environment is provided. The apparatus is configured to: receive a first score, wherein the first score comprises a first numerical value associated with a first level of quality, wherein the first level of quality is associated with a first deliverable; receive a second score, wherein the second score comprises a second numerical value associated with a second level of quality, wherein the second level of quality is associated with the first deliverable; and process the first score and the second score to generate a third score.

2 Claims, 9 Drawing Sheets

(56) References Cited

U.S. PATENT DOCUMENTS

| | | | |
|---|---|---|---|
| 7,337,124 B2 | 2/2008 | Corral | |
| 7,681,085 B2 | 3/2010 | Mahmud et al. | |
| 7,742,939 B1 | 6/2010 | Pham | |
| 7,774,743 B1 * | 8/2010 | Sanchez et al. | 717/103 |
| 8,548,843 B2 | 10/2013 | Folk et al. | |
| 8,751,436 B2 | 6/2014 | Lowry et al. | |
| 2002/0156668 A1 | 10/2002 | Morrow et al. | |
| 2003/0061283 A1 | 3/2003 | Dutta et al. | |
| 2003/0188290 A1 | 10/2003 | Corral | |
| 2003/0225652 A1 * | 12/2003 | Minow et al. | 705/36 |
| 2004/0015377 A1 | 1/2004 | Hostetler | |
| 2005/0160395 A1 | 7/2005 | Hughes | |
| 2006/0149575 A1 | 7/2006 | Varadarajan et al. | |
| 2006/0224441 A1 | 10/2006 | Kerkar et al. | |
| 2007/0074151 A1 | 3/2007 | Rivera et al. | |
| 2008/0092108 A1 | 4/2008 | Corral | |
| 2008/0140485 A1 | 6/2008 | Williams | |
| 2008/0155508 A1 | 6/2008 | Sarkar et al. | |
| 2009/0055804 A1 | 2/2009 | Blaschek et al. | |
| 2009/0070734 A1 | 3/2009 | Dixon et al. | |
| 2009/0083268 A1 | 3/2009 | Coqueret et al. | |
| 2009/0276257 A1 | 11/2009 | Draper et al. | |
| 2009/0319833 A1 | 12/2009 | Nir-Buchbinder et al. | |
| 2010/0114638 A1 | 5/2010 | Bugayenko | |
| 2010/0251027 A1 | 9/2010 | Yawalkar et al. | |
| 2011/0022551 A1 | 1/2011 | Dixon | |
| 2011/0055799 A1 | 3/2011 | Kaulgud et al. | |
| 2011/0231828 A1 | 9/2011 | Kaulgud et al. | |
| 2012/0123994 A1 | 5/2012 | Lowry et al. | |
| 2012/0254829 A1 | 10/2012 | Bhalla et al. | |
| 2012/0272220 A1 | 10/2012 | Calcagno et al. | |
| 2014/0123110 A1 | 5/2014 | Wan et al. | |

OTHER PUBLICATIONS

Donald P. Ballou et al., Enhancing DataQuality in DataWarehouse Environments, Jan. 1999, ACM, vol. 42, 73-78.

IT Governance Institute. "COBIT 3rd Edition: Control Objectives." Released by the COBIT Steering Committee and the IT Governance InstituteTM. 155 pages. Jul. 2000. http://www.netbotz.com/library/Cobit_regulations.pdf. Retrieved: Jul. 16, 2013.

Tilke, Julie. "Introduction to Project Management Best Practices: COBIT." Guest Opinions. ITBusinessEdge.com. 8 pages. Dated: Oct. 29, 2009. http://www.itbusinessedge.com/cm/community/features/guestopinions/blog/introduction-to-project-management-best-practices-cobit/?cs=36809. Retrieved: Jul. 16, 2013.

* cited by examiner

| | 470 | 480 | 490 | 492 | 494 |
|---|---|---|---|---|---|
| | DELIVERABLE 1 | QUANTITATIVE SCORE 1 | QUALITATIVE SCORE 1 | TOTAL 1 | COMMENTS 1 |
| | DELIVERABLE 2 | QUANTITATIVE SCORE 2 | QUALITATIVE SCORE 2 | TOTAL 2 | COMMENTS 2 |
| | DELIVERABLE 3 | QUANTITATIVE SCORE 3 | QUALITATIVE SCORE 3 | TOTAL 3 | COMMENTS 3 |
| OVERALL PHASE SCORE 496 ||||||

Figure 4B

| | 491 | 493 | 495 | 497 | 498 |
|---|---|---|---|---|---|
| | CONTROL OBJECTIVE 1 | QUANTITATIVE SCORE 1 | QUALITATIVE SCORE 1 | TOTAL 1 | COMMENTS 1 |
| | CONTROL OBJECTIVE 2 | QUANTITATIVE SCORE 2 | QUALITATIVE SCORE 2 | TOTAL 2 | COMMENTS 2 |
| | CONTROL OBJECTIVE 3 | QUANTITATIVE SCORE 3 | QUALITATIVE SCORE 3 | TOTAL 3 | COMMENTS 3 |
| OVERALL PHASE SCORE 499 | | | | | |

DETERMINING A QUALITY SCORE FOR INTERNAL QUALITY ANALYSIS

CROSS-REFERENCE TO RELATED APPLICATIONS

This application is a continuation of U.S. patent application Ser. No. 13/944,164, filed Jul. 17, 2013; the contents of which are hereby incorporated by reference.

BACKGROUND OF THE INVENTION

There is a need to efficiently assess and control the quality of a project in a production environment.

BRIEF SUMMARY OF THE INVENTION

In some embodiments, an apparatus for assessing and controlling the quality of a project in a production environment is provided. The apparatus comprises a memory, a processor, and a module stored in memory, executable by the processor, and configured to: receive a first score, wherein the first score comprises a first numerical value associated with a first level of quality, wherein the first level of quality is associated with a first deliverable; receive a second score, wherein the second score comprises a second numerical value associated with a second level of quality, wherein the second level of quality is associated with the first deliverable; and process the first score and the second score to generate a third score.

In some embodiments, the first score comprises at least one of quantitative information or qualitative information.

In some embodiments, the second score comprises at least one of quantitative information or qualitative information.

In some embodiments, the quantitative information comprises at least one of a numerical value, a percentage, a point value, or a score.

In some embodiments, the qualitative information comprises at least one of a scoring criterion, a level of quality, or a keyword.

In some embodiments, the first deliverable comprises at least one of a project goal, milestone, or product.

In some embodiments, the first deliverable is associated with a phase of project execution.

In some embodiments, a color is associated with at least one of the first score, the second score, or the first deliverable.

In some embodiments, the color indicates at least one of a status, a level of completion, or a level of quality.

In some embodiments, the apparatus comprises a numerical value that defines a threshold that, when crossed, determines at least one of a color, a status, or a quality score of the first deliverable.

In some embodiments, the apparatus of transmits a message to a user.

In some embodiments, the message comprises a notification of the generation of the third score.

In some embodiments, the user comprises at least one of an internal operations specialist, a project manager, or a member quality assurance team.

In some embodiments, the apparatus is further configured to provide a checklist, wherein the checklist includes required items and tasks that are to be completed within the scope of the deliverable, a quality score, wherein the quality score is defined by weighting responses to rating criteria, and a comments section.

In some embodiments, the apparatus is further configured to define at least one control objective.

In some embodiments, the apparatus is further configured to provide a user interface for determining a quality score for a deliverable, wherein the user interface includes a checklist, scoring criteria, a quality score, a weight, and an overall score.

In some embodiments, a method for determining a quality score for internal quality analysis is provided. The method comprises: receiving a first score, wherein the first score comprises a first numerical value associated with a first level of quality, wherein the first level of quality is associated with a first deliverable; receiving a second score, wherein the second score comprises a second numerical value associated with a second level of quality, wherein the second level of quality is associated with the first deliverable; and processing the first score and the second score to generate a third score.

In some embodiments, a computer program product for determining a quality score for internal quality analysis is provided. The computer program product comprises a non-transitory computer-readable medium comprising code causing a computer to: receive a first score, wherein the first score comprises a first numerical value associated with a first level of quality, wherein the first level of quality is associated with a first deliverable; receive a second score, wherein the second score comprises a second numerical value associated with a second level of quality, wherein the second level of quality is associated with the first deliverable; and process the first score and the second score to generate a third score.

BRIEF DESCRIPTION OF THE DRAWINGS

Having thus described embodiments of the invention in general terms, reference will now be made to the accompanying drawings, where:

DETAILED DESCRIPTION OF EMBODIMENTS OF THE INVENTION

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

In some embodiments, an "entity" as used herein may be a financial institution. For the purposes of this invention, a "financial institution" may be defined as any organization, entity, or the like in the business of moving, investing, or lending money, dealing in financial instruments, or providing financial services. This may include commercial banks, thrifts, federal and state savings banks, savings and loan associations, credit unions, investment companies, insurance companies and the like. In other embodiments, an "entity" may not be a financial institution.

In some embodiments, a "user" may be an internal operations specialist, a project manager, or a member quality assurance team associated with the entity.

The present invention may enable an apparatus (e.g. a computer system) associated with the entity to efficiently assess and control quality in a production environment. In some embodiments, a framework may be provided for managing and maintaining the quality of a project as the project moves through various phases of project execution. The framework may include a unique combination of proprietary and third party processes that ensure a desired level of quality is maintained throughout project execution. All in all, utilizing the present invention may help teams to meet and/or surpass industry-standard expectations.

The framework may include a user interface from which the user manages a project. In some embodiments, the user interface may include a visual representation of the project and its associated phases of project execution. For example, a block diagram or a map may depict how each piece of the project is connected. In other embodiments, the user interface may define a menu, a table, a list, or the like. A typical user interface defines three menu levels: a Phase Level, a Deliverable Level, and a Deliverable Level Artifact.

The Phase Level menu may include an overview of the project's phases of project execution at the highest level of abstraction. In some embodiments, one or more phases of project execution may be defined by the framework. Typically, the framework defines phases of project execution across one of three methodologies including Agile, Accelerated Work Effort (AWE), and Define, Analyze, Improve, and Control (DAIC). The Phase Level menu may enable the user to view or select at least one piece of the project associated with the defined phases of the project, including a deliverable, a team, or the like. In some embodiments, a color may be associated with the deliverable indicates a type of deliverable, such as a risk deliverable or a standard deliverable. In other embodiments, an icon (or another indicator) may indicate that there are multiple sub-deliverables associated with the deliverable. For example, if a deliverable includes a "plus sign" icon, the deliverable may include multiple sub-deliverables. In alternative embodiments, a combination of the color and the icon may be utilized throughout the Phase Level menu.

Figure 3A:
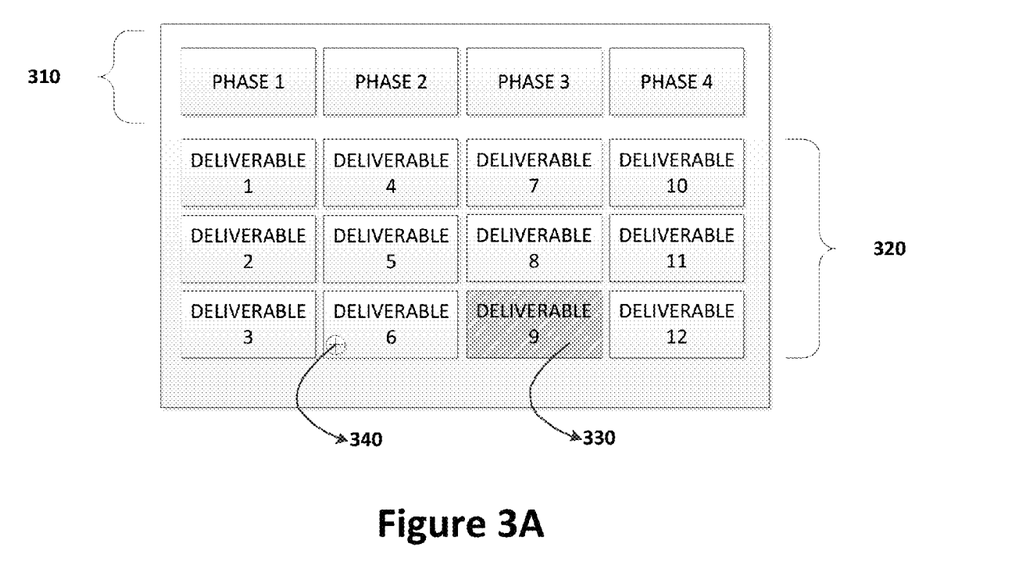
FIG. 3A is an exemplary user interface for the Phase Level, in accordance with embodiments of the present invention.

When the user selects a deliverable from the Phase Level menu, the apparatus may be configured to present to the user the Deliverable Level menu interface (e.g., when the user selects a deliverable (e.g., Deliverable 6) from FIG. 3A that has a "+" icon). The Deliverable Level menu interface may include a team or a sub-deliverable associated with the selected deliverable. The user may also select a Deliverable Level Artifact from the Phase Level menu (e.g., when the user selects a deliverable (e.g., Deliverable 3) from FIG. 3A that does not have a "+" icon).

When the user selects information associated with the selected deliverable or associated sub-deliverable, the apparatus may be configured to present to the user the Deliverable Level Artifact interface. The Deliverable Level Artifact interface may provide the user with information associated with the deliverable, including but not limited to a list of critical elements, a deliverable title, a control objective, a description, a usage, a timeline, a deliverable dependency, an update, a team name or a list of contributors, a status, a link to a deliverable, or the like. The Deliverable Level Artifact interface may serve as a hub for information associated with a deliverable (or an associated sub-deliverable). The user may better understand how the deliverable and its associated information are connected to other deliverables, sub-deliverables, team members, or the like of a project.

The information included in the Phase Level, the Deliverable Level, and the Deliverable Level Artifact interfaces may be sorted or filtered by a variety of criteria including a deliverable title, a date, a description, a usage, an update, a team, a template, or the like. The information may also be edited, modified, deleted, or added by the user. Typically, the user is removed from the project itself, such as a member of an internal quality assurance team. If the user is directly associated with the project, such as a project manager or a developer, he or she may not have access to edit, modify, add, or delete information.

Each phase, deliverable, or control objective of the project may also include a threshold value associated with a level of acceptable quality, progress, or the like. By assessing the level of quality, progress, or the like of each deliverable, the apparatus may determine whether or not each deliverable is of adequate quality, progress, or the like and may pass through a tollgate. To accurately assess the quality of the project (and each of the project's associated phases, deliverables, or control objectives), the user may utilize a Deliverable Quality Assurance (DQA) program.

The DQA may include a checklist of required items for project execution. The checklist may include a list of sub-deliverables or control objectives that are to be included in each deliverable. Further, the checklist may provide a control objective, scoring criteria, a reference to Enterprise Change Standards (ECS), a status, a weight, a numerical value, a comment, or the like.

The checklist may be used to evaluate the quality of the deliverable. The user may manually enter information or responses to items that are on the checklist. The apparatus may then calculate the level of quality associated with the deliverable. In other words, the user's responses to the checklist may be processed by the apparatus to create an overall score of quality for the deliverable.

Any deliverable may be rated based on its adherence to critical elements. The critical elements may include all items or sub-deliverables that are to be included or addressed in the deliverable. This may ensure that if all items in the DQA checklist are met, there is a high probability that the deliverable will be in accordance with ECS as well. Essentially, the DQA may serve as an additional (and perhaps more thorough) level of internal quality assurance.

Based on its adherence to the critical elements, the deliverable may receive a review score. This review score may be defined by the scoring criteria, which may include approvals, a description of the project, or the like. In some embodiments, a color, a numerical value, or a weight may be associated with the review score. Typically, the review score is determined to be high (colored green and associated with a numerical value of 5), medium (colored yellow and associated with a numerical value of 3), or low (colored red and associated with a numerical value of 1). Each assigned review score may be weighted such that the combination of all review scores for a particular piece of the project totals to 100%. The combination of each review score may generate a total score for the deliverable.

Similarly, the total score for each deliverable may be collected and processed to form an overall score for the project as a whole. The overall score may determine how the entity will continue with project execution. For example, if the overall score of the project is quite low, then the entity may decide to revisit or restructure the plans for the project. Conversely, if the total score of a deliverable is high, the deliverable may pass the DQA test tollgate and be cleared for the continuation of project execution. The user may interpret the review score, the total score, or the overall score at any stage of project execution.

In some embodiments, the checklist may be directed to measuring quantitative items of the project. In other embodiments, the checklist may be directed to measuring qualitative items of the project. Typically, the overall score for the project is calculated by combining the total score associated with quantitative items and the total score associated with qualitative items.

The checklist may be edited, viewed, deleted, or created by the user. In some embodiments, the apparatus may be configured to prefill or automatically complete the checklist. In other embodiments, the checklist may be executed manually.

In some embodiments, the apparatus may transmit a message to the user in response to calculating of the quality score or the overall score. The message may include a notification that the DQA process is completed, that a particular status has been reached, or the like.

Currently, the entity may utilize Enterprise Change Standards (ECS). ECS may define a set of guidelines and/or industry standards which the project design, development, and execution may follow. By adhering to ECS, the entity may be able to maintain the progression of the project at a high level of quality. In some embodiments, ECS includes at least one control management system. The present invention may uniquely integrate ECS and its associated control management systems into the framework.

All in all, the purpose of the framework may be to ensure a desired level of quality throughout the project execution phases of a project. By evaluating each deliverable based on industry standards and proprietary scoring criteria, the framework can increase efficiency in the entity's project execution processes. An easy-to-navigate user interface and innovative quality assessment tools may simplify the management of the project.

Figure 1:
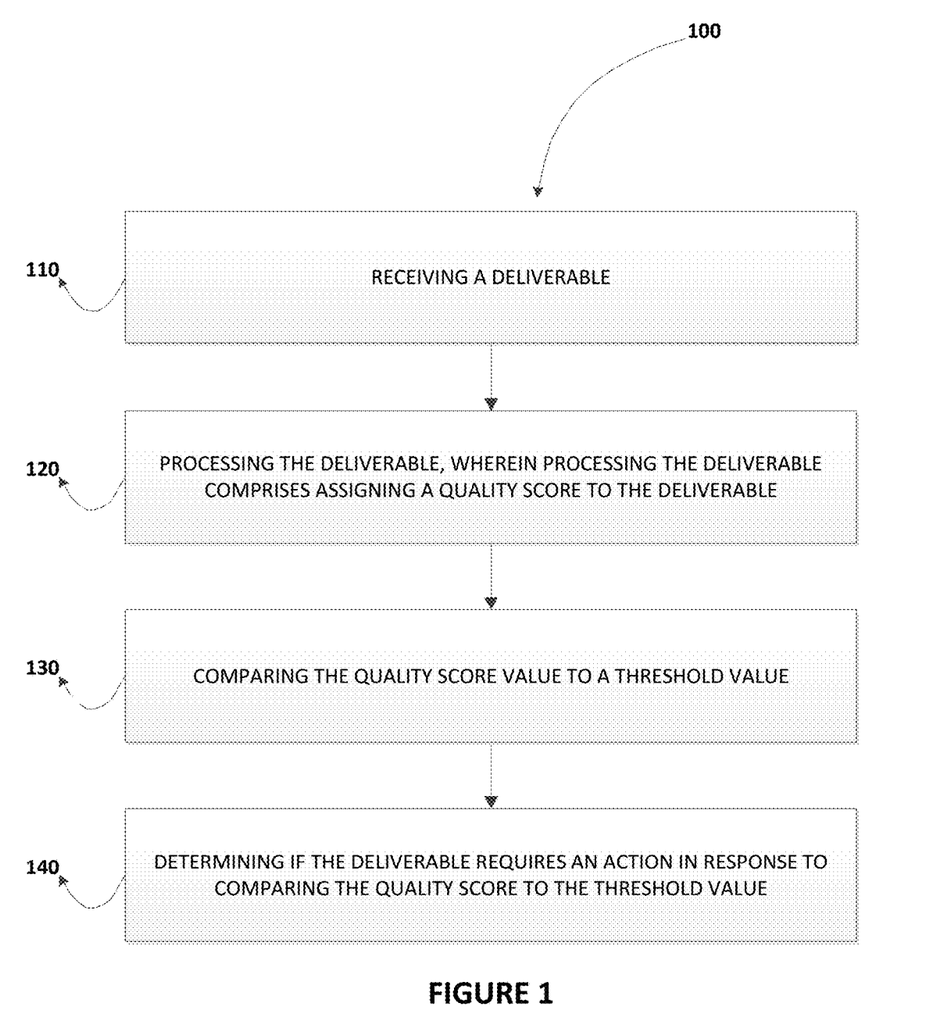
FIG. 1 is a general process flow for assessing and controlling the quality of a project, in accordance with embodiments of the present invention.

FIG. 1 presents an exemplary process flow diagram 100 for implementing the framework. At block 110, the process includes receiving a deliverable. At block 120, the process includes processing the deliverable, wherein processing the deliverable comprises assigning a quality score to the deliverable. At block 130, the process includes comparing the quality score value to a threshold value. At block 140, the process includes determining if the deliverable requires an action in response to comparing the quality score to the threshold value.

Figure 2:
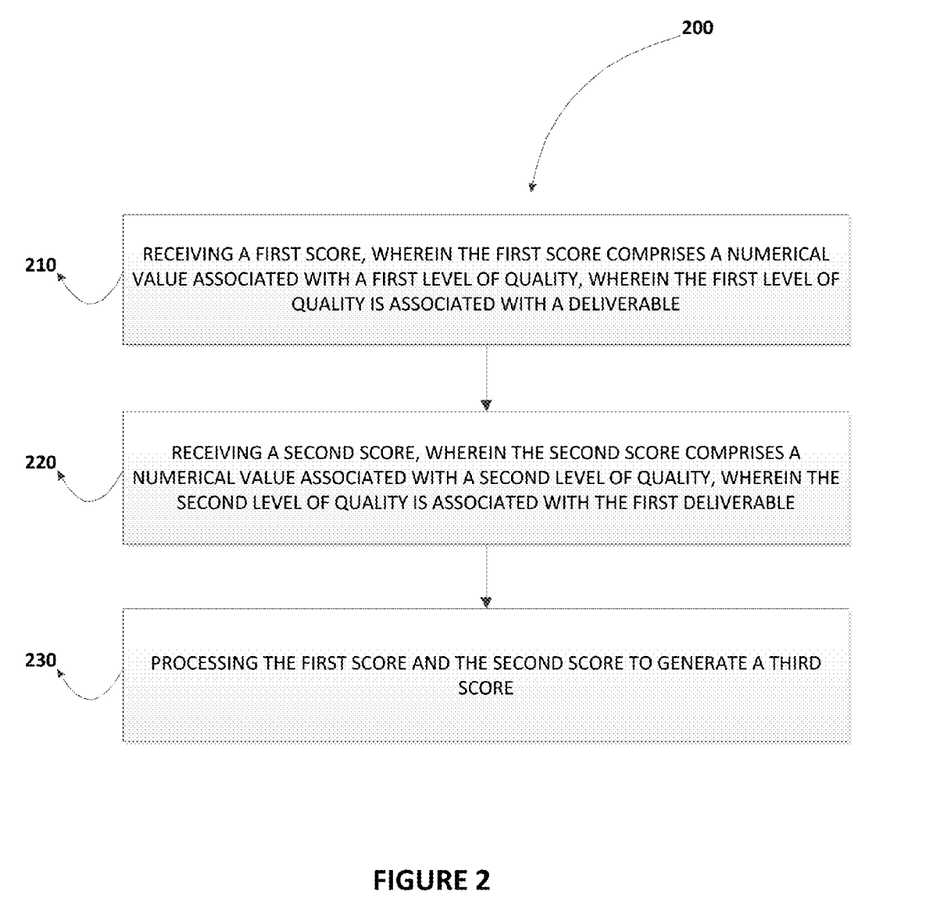
FIG. 2 is a general process flow for determining the quality of a project, in accordance with embodiments of the present invention.

FIG. 2 presents an exemplary process flow diagram 200 for processing a deliverable using DQA. At block 210, the process includes receiving a first score, wherein the first score comprises a first numerical value associated with a first level of quality, wherein the first level of quality is associated with a first deliverable. At block 220, the process includes receiving a second score, wherein the second score comprises a second numerical value associated with a second level of quality, wherein the second level of quality is associated with the first deliverable. At block 230, the process includes processing the first score and the second score to generate a third score. The third score may be generated by totaling the first and second scores or by generating an average of the first score and the second score, or by generating some other mathematical computation of the first and second scores.

FIG. 3A presents an exemplary user interface for the Phase Level menu. The defined phases of the project are listed at block 310. Each phase 310 may include at least one deliverable 320 that includes information about the deliverable. A color 330 indicates a type of deliverable. An icon 340 indicates that there are multiple deliverables or sub-deliverables associated with the selected deliverable. Upon selecting a deliverable, the user may be presented with the Deliverable Level menu.

Figure 3B:
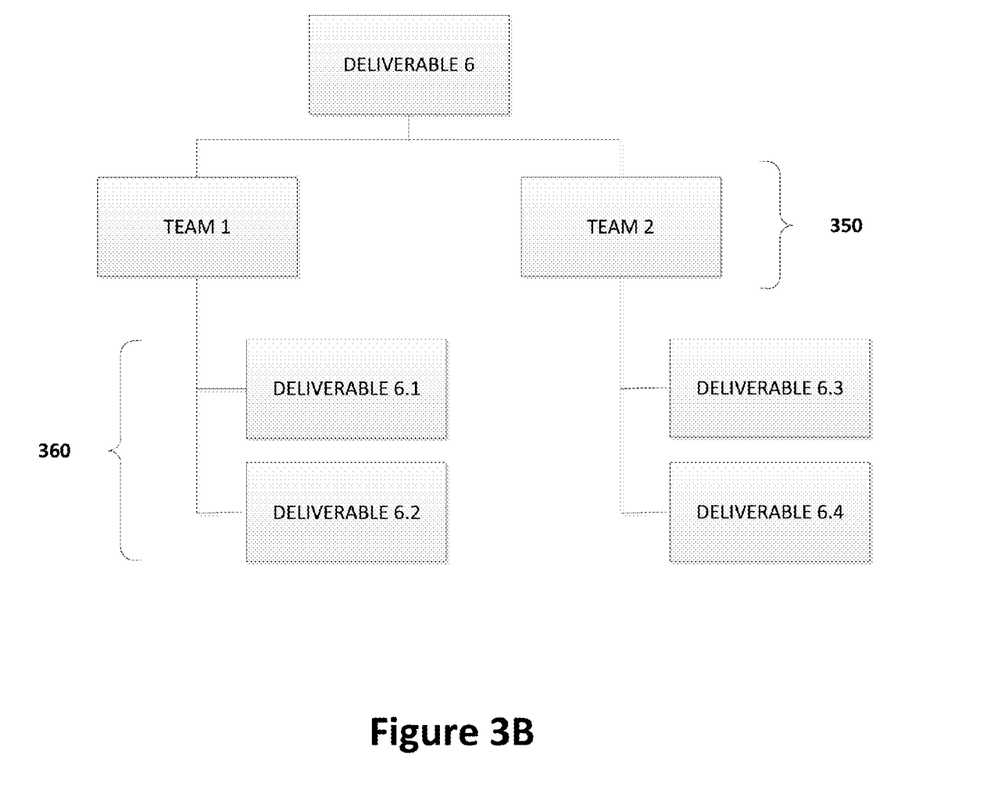
FIG. 3B is an exemplary user interface for the Deliverable Level, in accordance with embodiments of the present invention.

FIG. 3B presents an exemplary user interface for the Deliverable Level menu. The Deliverable Level menu may include a map of connectivity associated with the selected deliverable. For example, the map may present the team 350 associated with the deliverable, as well as any associated deliverable artifacts 360. The user may select to view an associated deliverable artifact 360.

Figure 3C:
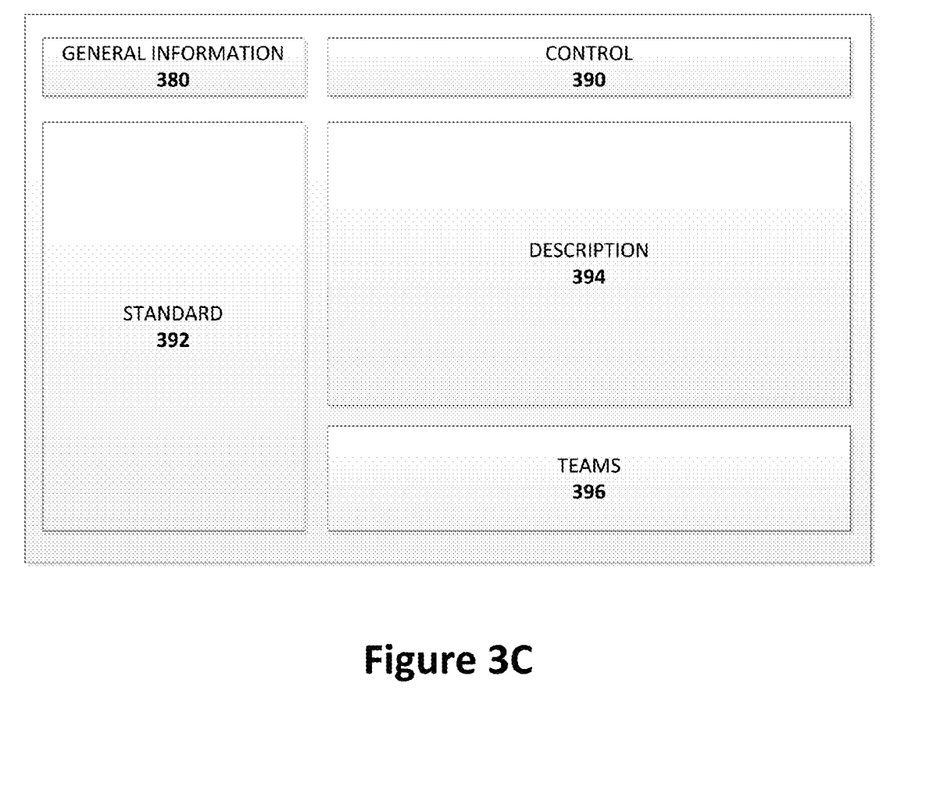
FIG. 3C is an exemplary user interface for the Deliverable Level Artifact, in accordance with embodiments of the present invention.

FIG. 3C presents an exemplary user interface for the Deliverable Level Artifact interface. The Deliverable Level Artifact interface may include information associated with the selected deliverable such as general information 380 (information associated with the team, the project, the deliverable title, a reference system, or the like), a control 390, a critical element standard 392 (definition of the critical element), a description 394, a team of responsible parties 396, or the like.

Figure 4A:
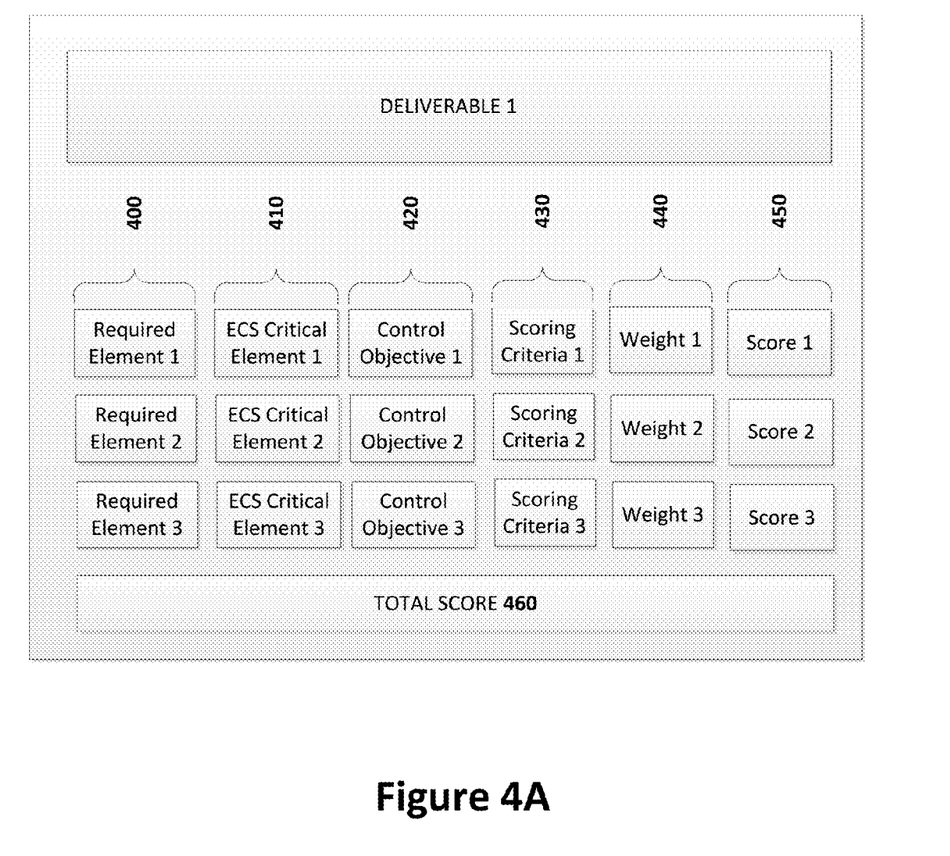
FIG. 4A is an exemplary user interface for determining the quality score of a deliverable, in accordance with embodiments of the present invention.

FIG. 4A presents an exemplary user interface for assessing quality of a deliverable via the DQA checklist. The deliverable's quality may be assessed based on at least one required element 400, ECS critical element 410, control objective 420, or scoring criteria 430 which may address either qualitative or quantitative aspects of the deliverable. Each scoring criterion 430 may include a weight 440, which may place a desired emphasis on certain scoring criteria 430. A score 450 may also be associated with each scoring criterion 430. A total score 460 may be calculated by combining the scores 450 of each rating criterion 430 using an average or similar computation.

Figure 4B:
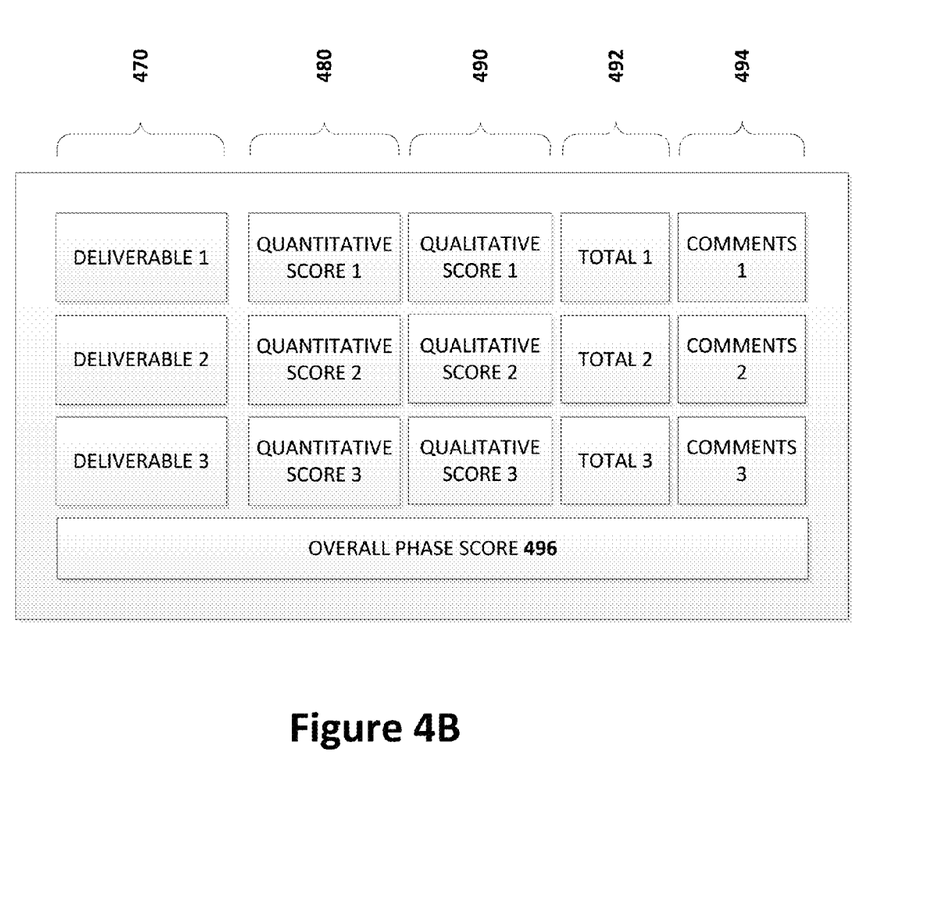
FIG. 4B is an exemplary user interface for determining the overall score of a phase of a project, in accordance with embodiments of the present invention.

FIG. 4B presents an exemplary user interface for determining the quality of a phase of a project. The phase may include multiple deliverables 470 which may each receive a quantitative score 480, a qualitative score 490, a total score 492, or comments 494 based on the DQA checklist. The apparatus may calculate the overall score 496 for the phase of the project's quality. Based on this overall score 496, the entity or the user may be able to make a more educated decision about the development or production of the project.

Figure 4C:
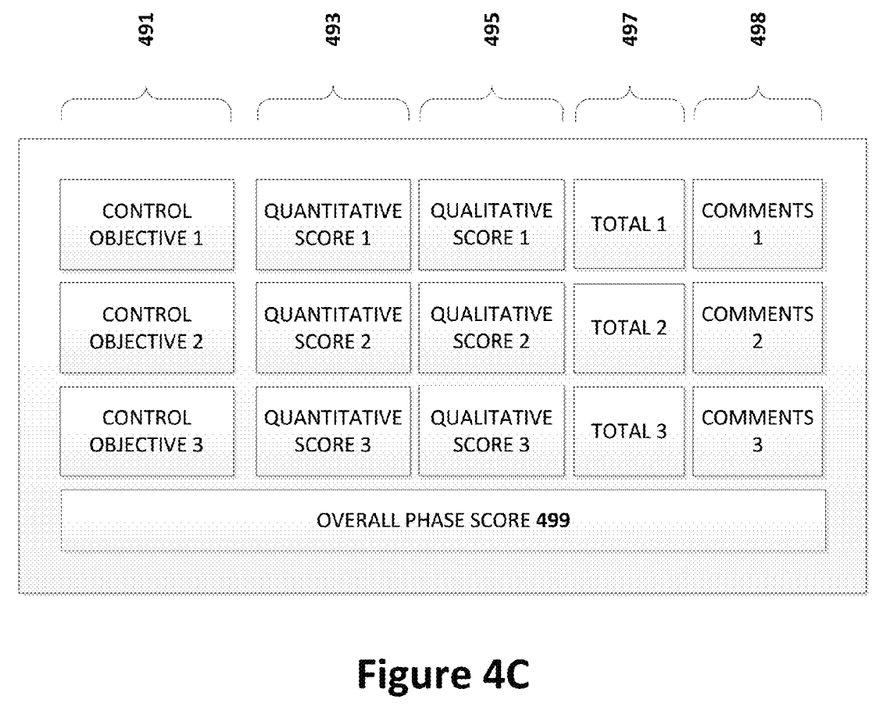
FIG. 4C is an exemplary user interface for determining the overall score of control objective, in accordance with embodiments of the present invention.

FIG. 4C presents an exemplary user interface for determining the quality of a control objective. A plurality of control objectives 491 may each receive a quantitative score 493, a qualitative score 495, a total score 497, or comments 498 based on the DQA checklist. The apparatus may calculate an overall score 499 for the control objectives' 491 collective quality. Based on this overall score 499, the entity or the user may be able to make a more educated decision about the adherence of the project to control objectives.

Figure 5:
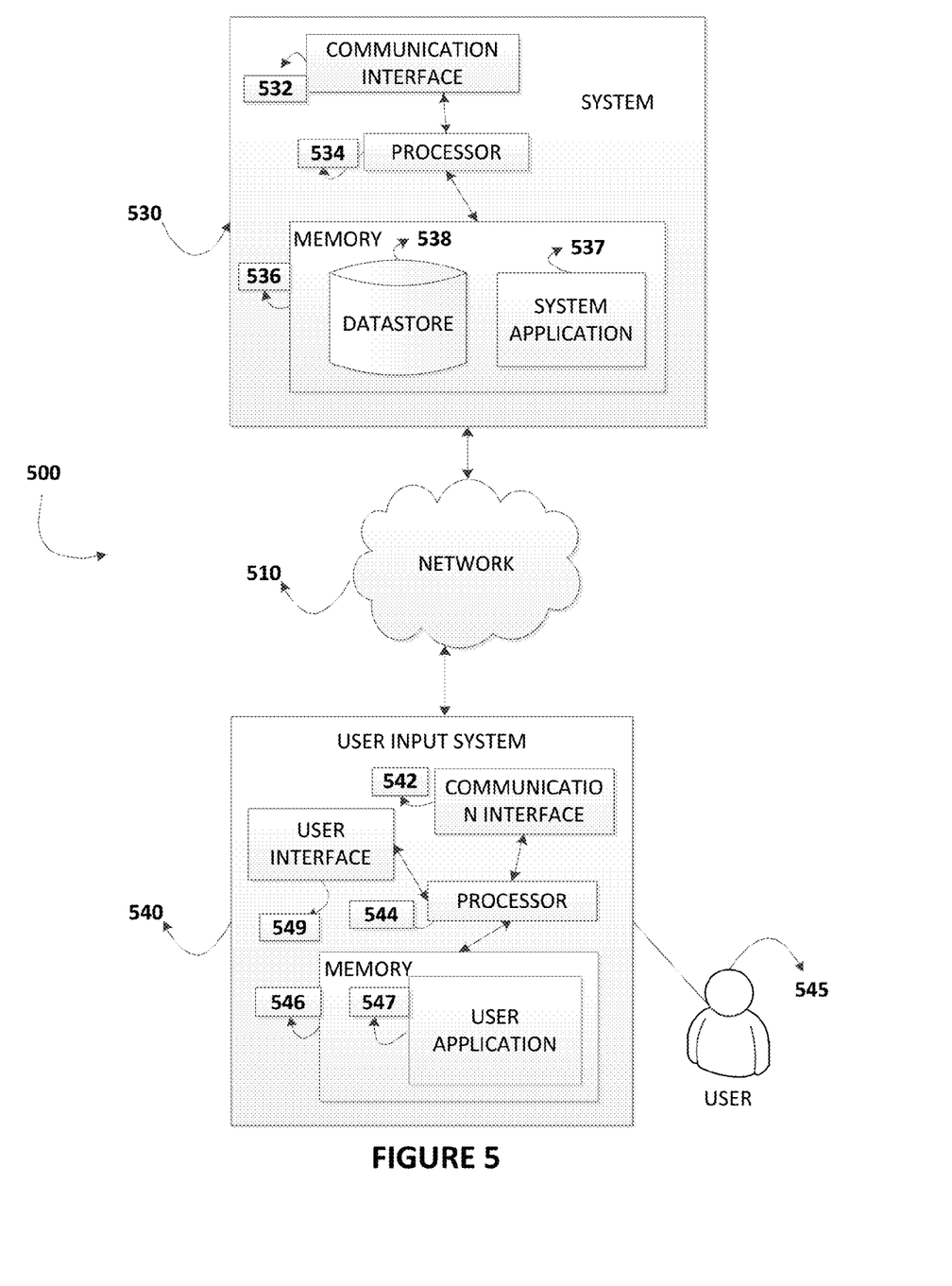
FIG. 5 is a block diagram illustrating technical components of a system for assessing and controlling the quality of a project, in accordance with embodiments of the present invention.

FIG. 5 presents an exemplary block diagram of the system environment 500 for implementing the process flow described in FIGS. 1 and 2 in accordance with embodiments of the present invention. As illustrated, the system environment 500 includes a network 510, a system 530, and a user input system 540. Also shown in FIG. 5 is a user 545 of the user input system 540. The user input system 540 may be a mobile device or other non-mobile computing device. The user 545 may be a person who uses the user input system 540 to execute a user application 547. The user application 547 may be an application to communicate with the system 530, perform a transaction, input information onto a user interface presented on the user input system 540, or the like. The user application 547 and/or the system application 537 may incorporate one or more parts of any process flow described herein.

As shown in FIG. 5, the system 530, and the user input system 540 are each operatively and selectively connected to the network 510, which may include one or more separate networks. In addition, the network 510 may include a telecommunication network, local area network (LAN), a wide area network (WAN), and/or a global area network (GAN), such as the Internet. It will also be understood that the network 510 is secure and may also include wireless and/or wireline and/or optical interconnection technology.

The user input system 540 may include any computerized apparatus that can be configured to perform any one or more of the functions of the user input system 540 described and/or contemplated herein. For example, the user 545 may use the user input system 540 to transmit and/or receive information or commands to and from the system 530. In some embodiments, for example, the user input system 540 may include a personal computer system (e.g. a non-mobile or non-portable computing system, or the like), a mobile computing device, a personal digital assistant, a mobile phone, a tablet computing device, a network device, and/or the like. As illustrated in FIG. 5, in accordance with some embodiments of the present invention, the user input system 540 includes a communication interface 542, a processor 544, a memory 546 having an user application 547 stored therein, and a user interface 549. In such embodiments, the communication interface 542 is operatively and selectively connected to the processor 544, which is operatively and selectively connected to the user interface 549 and the memory 546. In some embodiments, the user 545 may use the user application 547 to execute processes described with respect to the process flows described herein. Specifically, the user application 547 executes the process flow described in FIGS. 1 and 2.

Each communication interface described herein, including the communication interface 542, generally includes hardware, and, in some instances, software, that enables the user input system 540, to transport, send, receive, and/or otherwise communicate information to and/or from the communication interface of one or more other systems on the network 510. For example, the communication interface 542 of the user input system 540 may include a wireless transceiver, modem, server, electrical connection, and/or other electronic device that operatively connects the user input system 540 to another system such as the system 530. The wireless transceiver may include a radio circuit to enable wireless transmission and reception of information. Additionally, the user input system 540 may include a positioning system. The positioning system (e.g. a global positioning system (GPS), a network address (IP address) positioning system, a positioning system based on the nearest cell tower location, or the like) may enable at least one of the user input system 540 or an external server or computing device in communication with the user input system 540 to determine the location (e.g. location coordinates) of the user input system 540.

Each processor described herein, including the processor 544, generally includes circuitry for implementing the audio, visual, and/or logic functions of the user input system 540. For example, the processor may include a digital signal processor device, a microprocessor device, and various analog-to-digital converters, digital-to-analog converters, and other support circuits. Control and signal processing functions of the system in which the processor resides may be allocated between these devices according to their respective capabilities. The processor may also include functionality to operate one or more software programs based at least partially on computer-executable program code portions thereof, which may be stored, for example, in a memory device, such as in the user application 547 of the memory 546 of the user input system 540.

Each memory device described herein, including the memory 546 for storing the user application 547 and other information, may include any computer-readable medium. For example, memory may include volatile memory, such as volatile random access memory (RAM) having a cache area for the temporary storage of information. Memory may also include nonvolatile memory, which may be embedded and/or may be removable. The non-volatile memory may additionally or alternatively include an EEPROM, flash memory, and/or the like. The memory may store any one or more of pieces of information and data used by the system in which it resides to implement the functions of that system.

As shown in FIG. 5, the memory 546 includes the user application 547. In some embodiments, the user application 547 includes an interface for communicating with, navigating, controlling, configuring, and/or using the user input system 540. In some embodiments, the user application 547 includes computer-executable program code portions for instructing the processor 544 to perform one or more of the functions of the user application 547 described and/or contemplated herein. In some embodiments, the user application 547 may include and/or use one or more network and/or system communication protocols.

Also shown in FIG. 5 is the user interface 549. In some embodiments, the user interface 549 includes one or more output devices, such as a display and/or speaker, for presenting information to the user 545. In some embodiments, the user interface 549 includes one or more input devices, such as one or more buttons, keys, dials, levers, directional pads, joysticks, accelerometers, controllers, microphones, touchpads, touchscreens, haptic interfaces, microphones, scanners, motion detectors, cameras, and/or the like for receiving information from the user 545. In some embodiments, the user interface 549 includes the input and display devices of a mobile device, which are operable to receive and display information.

FIG. 5 also illustrates a system 530, in accordance with an embodiment of the present invention. The system 530 may refer to the "apparatus" described herein. The system 530 may include any computerized apparatus that can be configured to perform any one or more of the functions of the system 530 described and/or contemplated herein. In accordance with some embodiments, for example, the system 530 may include a computer network, an engine, a platform, a server, a database system, a front end system, a back end system, a personal computer system, and/or the like. Therefore, the system 530 may be a server managed by the entity. The system 530 may be located at the facility associated with the entity or remotely from the facility associated with the entity. In some embodiments, such as the one illustrated in FIG. 5, the system 530 includes a communication interface 532, a processor 534, and a memory 536, which includes a system application 537 and a datastore 538 stored therein. As shown, the communication interface 532 is operatively and selectively connected to the processor 534, which is operatively and selectively connected to the memory 536.

It will be understood that the system application 537 may be configured to implement any one or more portions of the various user interfaces and/or process flow described herein. The system application 537 may interact with the user application 547. It will also be understood that, in some embodiments, the memory includes other applications. It will also be understood that, in some embodiments, the system application 537 is configured to communicate with the datastore 538, the user input system 540, or the like.

It will be further understood that, in some embodiments, the system application 537 includes computer-executable program code portions for instructing the processor 534 to perform any one or more of the functions of the system application 537 described and/or contemplated herein. In some embodiments, the system application 537 may include and/or use one or more network and/or system communication protocols.

In addition to the system application 537, the memory 536 also includes the datastore 538. As used herein, the datastore 538 may be one or more distinct and/or remote datastores. In some embodiments, the datastore 538 is not located within the system and is instead located remotely from the system. In some embodiments, the datastore 538 stores information or data described herein.

It will be understood that the datastore 538 may include any one or more storage devices, including, but not limited to, datastores, databases, and/or any of the other storage devices typically associated with a computer system. It will also be understood that the datastore 538 may store information in any known way, such as, for example, by using one or more computer codes and/or languages, alphanumeric character strings, data sets, figures, tables, charts, links, documents, and/or the like. Further, in some embodiments, the datastore 538 may include information associated with one or more applications, such as, for example, the system application 537. It will also be understood that, in some embodiments, the datastore 538 provides a substantially real-time representation of the information stored therein, so that, for example, when the processor 534 accesses the datastore 538, the information stored therein is current or substantially current.

It will be understood that the embodiment of the system environment illustrated in FIG. 5 is exemplary and that other embodiments may vary. As another example, in some embodiments, the system 530 includes more, less, or different components. As another example, in some embodiments, some or all of the portions of the system environment 500 may be combined into a single portion. Likewise, in some embodiments, some or all of the portions of the system 530 may be separated into two or more distinct portions.

In addition, the various portions of the system environment 500 may be maintained for and/or by the same or separate parties. It will also be understood that the system 530 may include and/or implement any embodiment of the present invention described and/or contemplated herein. For example, in some embodiments, the system 530 is configured to implement any one or more of the embodiments of the process flows described and/or contemplated herein in connection any process flow described herein. Additionally, the system 530 or the user input system 540 is configured to initiate presentation of any of the user interfaces described herein.

In accordance with embodiments of the invention, the term "module" with respect to a system may refer to a hardware component of the system, a software component of the system, or a component of the system that includes both hardware and software. As used herein, a module may include one or more modules, where each module may reside in separate pieces of hardware or software.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g. a memory) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:
1. A computer program product for internal quality analysis, for assessing and controlling the quality of a project, the computer program product comprising a non-transitory computer-readable storage medium comprising code causing at least one processing device to:
  receive electronic data associated with the project using a network of distributed servers, wherein the project comprises one or more project phases, each of the one or more project phases comprises one or more deliverables and each of the one or more deliverables comprises one or more sub-deliverables;
  initiate presentation of a user interface for display on electronic devices of one or more users using a user application, the user interface comprising information associated with the project; wherein the project information comprises a phase level, a deliverable level and a deliverable level artifact, wherein the phase level comprises information associated with one or more project phases, the deliverable level comprises information associated with one or more deliverables and the deliverable level artifact comprises information associated with one or more deliverables and information associated with one or more sub-deliverables;
  initiate access to the project information from electronic devices associated with one or more users, wherein initiating access further comprises:
    receiving a first set of authentication credentials from a first user via an electronic device associated with the first user;
    verifying the first set of authentication credentials; and
    enabling the first user to view and/or modify the information presented on the user interface based on at least the verification of the first set of authentication credentials;
  implement a deliverable quality assurance program to evaluate the quality of each of the one or more deliverables, wherein the deliverable quality assurance program comprises a checklist for each of the one or more deliverables, wherein the checklist comprises a scoring criteria for each of the one or more sub-deliverables associated with a deliverable, wherein implementing the deliverable quality assurance program, for each of the one or more sub-deliverables associated with the deliverable, based on the scoring criteria further comprises:
    receiving a first score, wherein the first score comprises a first numerical value associated with a first level of quality, wherein the first level of quality is associated with a sub-deliverable associated with the deliverable;

receiving a second score, wherein the second score comprises a second numerical value associated with a second level of quality, wherein the second level of quality is associated with the sub-deliverable associated with the deliverable;

processing the first score and the second score to generate a third score, wherein the third score is a review score for the sub-deliverable associated with the deliverable; and receiving one or more weights corresponding the sub-deliverable associated with the deliverable;

calculate a total quality score for each of the one or more deliverables based on at least the review scores and the one or more weights associated with each of the one or more sub-deliverables;

compare the total quality score of each of the one or more deliverables to a first threshold value;

determine if one or more deliverables require action in response to comparing each of the total quality scores to the first threshold value; and transmit control commands configured to cause the electronic devices of the one or more users to receive a message based on at least determining whether the one or more deliverables requires action.

2. A method for internal quality analysis, for assessing and controlling the quality of a project, the method comprising:

receiving, using a computing device processor, electronic data associated with the project using a network of distributed servers, wherein the project comprises one or more project phases, each of the one or more project phases comprises one or more deliverables and each of the one or more deliverables comprises one or more sub-deliverables;

initiating, using the computing device processor, presentation of a user interface for display on electronic devices of one or more users using a user application, the user interface comprising information associated with the project; wherein the project information comprises a phase level, a deliverable level and a deliverable level artifact, wherein the phase level comprises information associated with one or more project phases, the deliverable level comprises information associated with one or more deliverables and the deliverable level artifact comprises information associated with one or more deliverables and information associated with one or more sub-deliverables;

initiating, using the computing device processor, access to the project information from electronic devices of the one or more users, wherein initiating access further comprises:

receiving a first set of authentication credentials from a first user via an electronic device associated with the first user;

verifying the first set of authentication credentials; and enabling the first user to view and/or modify the information presented on the user interface based on at least the verification of the first set of authentication credentials;

implementing, using the computing device processor, a deliverable quality assurance program to evaluate the quality of each of the one or more deliverables, wherein the deliverable quality assurance program comprises a checklist for each of the one or more deliverables, wherein the checklist comprises a scoring criteria for each of the one or more sub-deliverables associated with a deliverable, wherein implementing the deliverable quality assurance program, for each of the one or more sub-deliverables associated with the deliverable, based on the scoring criteria further comprises:

receiving a first score, wherein the first score comprises a first numerical value associated with a first level of quality, wherein the first level of quality is associated with a sub-deliverable associated with the deliverable;

receiving a second score, wherein the second score comprises a second numerical value associated with a second level of quality, wherein the second level of quality is associated with the sub-deliverable associated with the deliverable;

processing the first score and the second score to generate a third score, wherein the third score is a review score for the sub-deliverable associated with the deliverable; and receiving one or more weights corresponding the sub-deliverable associated with the deliverable;

calculating, using the computing device processor, a total quality score for each of the one or more deliverables based on at least the review scores and the one or more weights associated with each of the one or more sub-deliverables;

comparing, using the computing device processor, the total quality score of each of the one or more deliverables to a first threshold value;

determining, using the computing device processor, if one or more deliverables require action in response to comparing each of the total quality scores to the first threshold value; and transmitting, using the computing device processor, control commands configured to cause the electronic devices of the one or more users to receive a message based on at least determining whether the one or more deliverables requires action.

* * * * *